(12) United States Patent
Wimmer

(10) Patent No.: US 8,421,650 B2
(45) Date of Patent: Apr. 16, 2013

(54) WHEEL GUIDE RAIL, CAR WASH SYSTEM AND METHOD FOR CENTRALLY POSITIONING A VEHICLE

(75) Inventor: Georg Wimmer, Affing (DE)

(73) Assignee: Waschtec Holding GmbH, Augsburg (DE)

( * ) Notice: Subject to any disclaimer, the term of this patent is extended or adjusted under 35 U.S.C. 154(b) by 281 days.

(21) Appl. No.: 12/990,422

(22) PCT Filed: Jul. 23, 2009

(86) PCT No.: PCT/EP2009/059517
§ 371 (c)(1),
(2), (4) Date: Dec. 2, 2010

(87) PCT Pub. No.: WO2010/010160
PCT Pub. Date: Jan. 28, 2010

(65) Prior Publication Data
US 2011/0115650 A1 May 19, 2011

(30) Foreign Application Priority Data

Jul. 24, 2008 (DE) .......................... 10 2008 034 571

(51) Int. Cl.
*G08G 1/123* (2006.01)
(52) U.S. Cl.
USPC ........................................ 340/989; 340/932.2
(58) Field of Classification Search .................. 340/989, 340/932.2, 435; 134/123, 18
See application file for complete search history.

(56) References Cited

U.S. PATENT DOCUMENTS 3,593,726 A 7/1971 Lockhart
3,596,241 A * 7/1971 Migneault .................. 340/932.2
(Continued)

FOREIGN PATENT DOCUMENTS

DE 2104049 A1 8/1972
DE 3843643 A1 6/1990
(Continued)

OTHER PUBLICATIONS

International Search Report published Jan. 28, 2010 for PCT/EP2009/059517, filed Jul. 23, 2009.
(Continued)

*Primary Examiner* — Shirley Lu
(74) *Attorney, Agent, or Firm* — Martin Fleit; Paul D. Bianco; Fleit Gibbons Gutman Bongini & Bianco PL

(57) ABSTRACT

The invention relates to a wheel guide rail (9; 10; 13; 14) for a car wash system for laterally delimiting a travel range (4) of a vehicle to be treated in the car wash system and a car wash system comprising treatment devices (1, 1', 3, 3') that can travel along a direction of travel (F) for a vehicle to be treated, a pair of wheel guide rails (10, 10') disposed at the wash system floor (B) between the treatment devices (1, 1', 3, 3') and running in the direction of travel (F) and at a distance from one another perpendicular to the direction of travel (F), said guide rails delimiting a lateral travel range (4) for the vehicle. The object of facilitating a safe and damage-free treatment and cleaning of vehicles is met by the invention by a wheel guide rail, wherein at least one distance sensor (9f; 11; 13f; 14f) is provided in the guide rail (9; 10; 13; 14) for measuring the distance from the guide rail (9; 10; 13; 14) to an outside of the wheel and/or side of the vehicle, a car wash system comprising such wheel guide rails and a method for centrally positioning a vehicle within a vehicle range (4) of a car wash system.

17 Claims, 3 Drawing Sheets

U.S. PATENT DOCUMENTS

| | | | |
|---|---|---|---|
| 5,033,490 A | | 7/1991 | Wade et al. |
| 5,226,436 A | * | 7/1993 | Kirby .................... 134/57 R |
| 6,661,516 B1 | | 12/2003 | Dietsch et al. |
| 2003/0145877 A1 | * | 8/2003 | Jones et al. .................... 134/18 |
| 2004/0056496 A1 | * | 3/2004 | Kenderian et al. ............. 295/8 |
| 2008/0127436 A1 | * | 6/2008 | MacDowell .................. 15/97.3 |

FOREIGN PATENT DOCUMENTS

| | | |
|---|---|---|
| EP | 1090235 A1 | 4/2001 |
| EP | 1614602 A1 | 1/2006 |

OTHER PUBLICATIONS

Written Opinion mailed May 24, 2010, for PCT/EP2009/059517, filed Jul. 23, 2009.

English Translation of International Preliminary Report published Feb. 8, 2011 for PCT/EP2009/059517, filed Jul. 23, 2009.

English Translation of Written Opinion published Feb. 3, 2011 for PCT/EP2009/059517, filed Jul. 23, 2009.

* cited by examiner

Fig. 8   Fig. 9
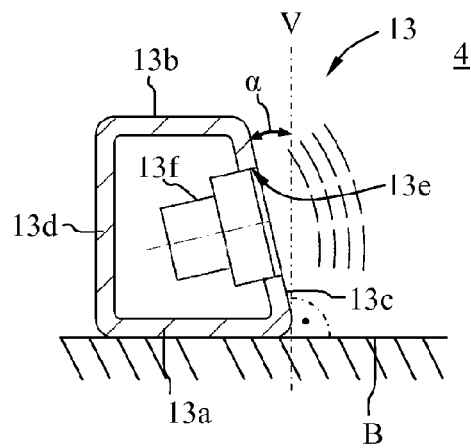
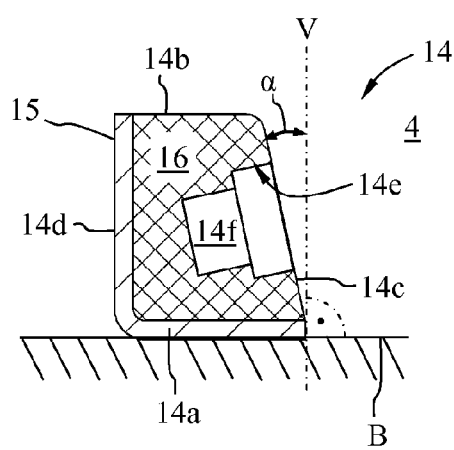
Fig. 10
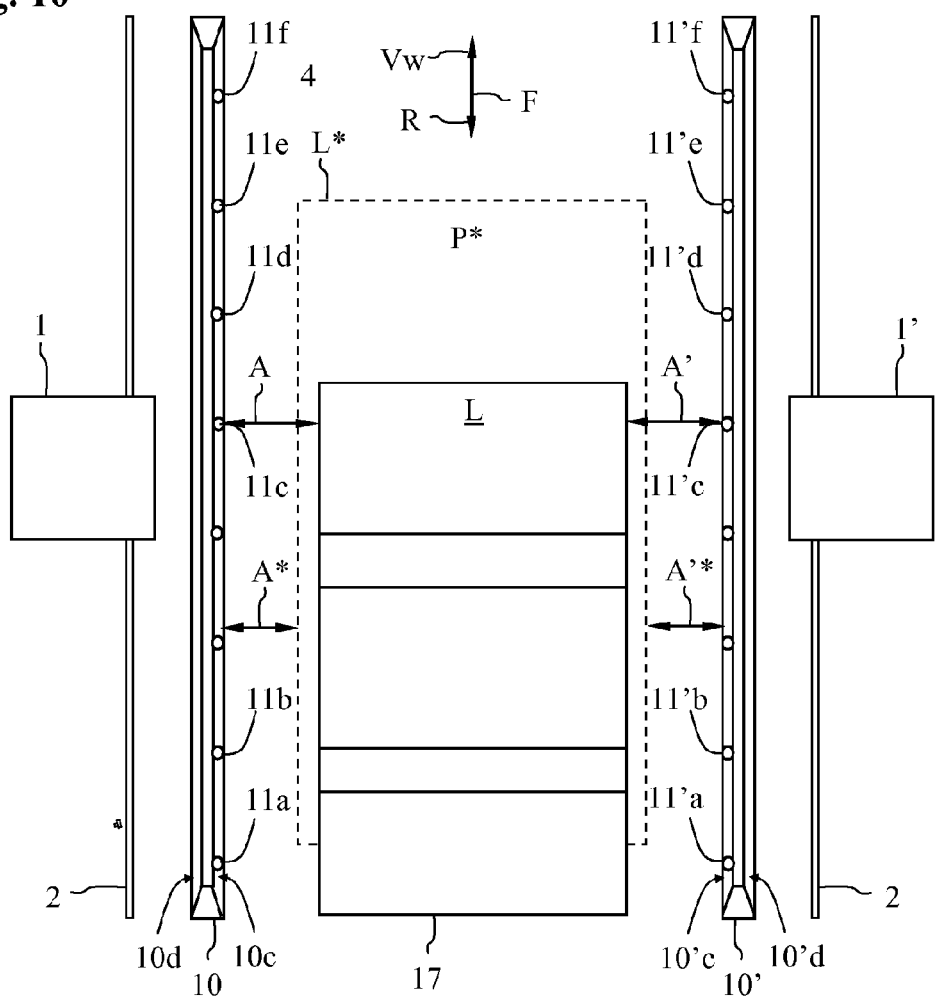

WHEEL GUIDE RAIL, CAR WASH SYSTEM AND METHOD FOR CENTRALLY POSITIONING A VEHICLE

FIELD OF THE INVENTION

The invention relates to a wheel-guide rail, a car wash system, and also a method for centrally positioning a vehicle in a travel range of a car wash system.

BACKGROUND OF THE INVENTION

A wheel-guide rail named above emerges from DE 21 04 049 A. The towing device in that document for vehicles, especially for washing systems, has two guide rails between which the wheels of one side of the vehicle are moved. The guide rails have a flat web that is arranged essentially perpendicular to the floor of the car wash system and on whose upper end a longitudinal bar with a circular cross section is arranged.

FIGS. 1-3 show other wheel-guide rails for car wash systems according to the class. In FIG. 1, a left foot 1 of a not-shown gantry post of a movable washing gantry of a car wash system is shown that can be moved in a direction of travel F along a running rail 2 on the floor B of a washing system. On the foot 1 there is a wheel-rim washer 3 that is shown schematically and points in the direction of a wheel rim of a vehicle to be washed. In order to be able to drive the vehicle to be washed as centrally as possible with respect to the gantry posts 1, 1' indicated in FIG. 2 by the feet in a travel range 4 of the car wash system, wheel-guide rails 5, 5' offset toward the travel range 4 next to the running rails 2, 2' are mounted on the floor of the car wash system. As emerges, in particular, from FIG. 2, the two wheel-guide rails 5 and 5' define the travel range 4 between which the wheels of a vehicle to be washed should move.

FIG. 3 shows examples for cross sections of known wheel-guide rails. A wheel-guide rail 6 shown in FIG. 3a) consists of a rectangular steel hollow profile, wherein the edges are slightly rounded. In a floor 6a and an end face 6b of the wheel-guide rail 6, passage boreholes are formed at defined distances, wherein the wheel-guide rail 6 can be screwed on the floor B of the washing system through these boreholes. FIG. 3b) shows another known wheel-guide rail 7. There, the wheel-guide rail from FIG. 3a was welded onto a floor plate or ground beam 7c, so that no passage boreholes are necessary in an end face 7a and a floor 7a of the wheel-guide rail 7. The wheel-guide rail 7 is then fastened by screws of the floor plate or ground beam 7c on the floor B of the washing system. A known wheel-guide rail 8 shown in FIG. 3c) also has a floor plate or ground beam 8a for mounting on the floor B of the washing system, while the guide part of the wheel-guide rail 8 is produced from a steel tube with a circular-ring-shaped cross section.

The known wheel-guide rails 5, 5' are used to guarantee that, while the vehicle is moving, the driver positions this vehicle as centrally as possible with respect to the lateral treatment devices, in order to have the most uniform travel path as possible in the case of treatment devices acting laterally on the vehicle. For example, the wheel washers 3 and 3' shown in FIG. 2 can be moved from the position away from the illustrated vehicle into the extended position not shown in FIG. 2 for washing the wheel rims. In order to achieve a good washing result here, it is desirable to press both onto the wheel rims with approximately the same contact pressure, which is possible, above all, when the vehicle is positioned exactly centrally relative to the gantry posts 1, 1'. A position of the vehicle that is not centered could have the result that the travel paths or ranges of treatment assemblies are not sufficient and therefore inadequate cleaning of the vehicle is produced. In addition, the wheel-guide rails 5 and 5' should guarantee that the vehicle is not in an area at risk of collision with the treatment assemblies or other parts of the washing gantry when the moveable washing gantry travels over the vehicle, for example, damage to the outside mirrors.

In order to guarantee this guide function, the wheel-guide rails 5, 5' must be high enough that the driver of the entering vehicle notices possibly driving against or also over a wheel-guide rail 5, 5', in order to be able to perform counter-steering. This is not a problem in the case of small, lightweight cars with small wheels, because contact with the typically 60 mm high wheel-guide rails 5, 5' with rectangular cross sections is easily noticed. However, more and more there are large, heavy vehicles with large vehicle widths and large wheel or wheel-rim diameters, for example, 21" wheel rims in the case of sports cars, off-road vehicles, or so-called SUV vehicles. In the case of these vehicles, driving against or over the wheel-guide rails 5, 5' is often not noticed by the driver due to the tire size and the large vehicle weight, so that the vehicles often come to lie off-center in the travel range 4 or even on the wheel-guide rails 5, 5'. Here, when the washing gantry moves over the vehicle, projecting vehicle parts, for example, outside mirrors, on the side of the vehicle in question are often damaged. In addition, the cleaning result is made worse, because the vehicle is too far from the treatment assemblies on the other side of the vehicle. Such large vehicles often have a large track width and thus outside wheel spacings, so that, in the case of old or narrow car wash systems, the wheel-guide rails are too close to each other and are always driven against or over.

In the case of such large vehicles, in order to be able to detect contact with the wheel-guide rails 5, 5', in a first approach, the height of the wheel-guide rails could be increased. This has the disadvantage, however, that in the case of vehicles with small tires or low-cross-section tires, not only the rubber tires, but also the wheel rims contact the wheel-guide rails 5, 5' that are typically made from steel, and in this way are damaged. Especially for the large vehicles named above, due to the large wheel-rim diameter, low-cross-section tires are often used, so that, in connection with the large vehicle width, such vehicles already contact the wheel-guide rails disproportionately often with their usually expensive wheel rims. Damaging such expensive wheel rims is very disadvantageous for the operator of the car wash system due to the high indemnity payments. These cases would be increased by the higher wheel-guide rails.

To avoid this disadvantage, above all, for low-cross-section tires, a second solution would be for the wheel-guide rails to have a lower construction. This has the result, however, that driving against or over the wheel-guide rails is no longer noticed due to these large vehicles, so that a good cleaning result is not achieved and there is also the risk of damage to other vehicle parts or treatment assemblies of the washing system.

A car wash system disclosed in U.S. Pat. No. 3,596,241 has wheel-guide rails made from tubes with switch arms arranged on these rails for detecting the vehicle tires. The switch arms are here mounted rigidly on the outside of the tube away from the vehicle and extend through round openings into the tubes on the side close to the vehicle. Both the tubes and also the switch arms are made from electrically conductive material and are connected to a switch display. In the normal state, the switch arms do not contact the tubes and also do not extend into the specified travel range of the vehicle. If the vehicle moves outside of the travel range, a wheel of the vehicle deforms one of the switch arms that then contacts its opening. In this way, an electrical circuit is made and a corresponding signal is displayed on a display. This construction has the disadvantage that the switch arms necessarily project outward and into the travel range due to their function. This raises the risk of unintentional triggering, for example, due to objects in the travel range that deform the switch arms or due to short-circuiting of the open contact (tubes and switch arms) of the switch circuit. This also raises the risk of damage to the switch arms due to vehicles driving against or over these arms. In addition, for the operator or the user of the system, there is the risk of electrical shock due to the open contacts. Also, a measurement of the distance is not possible, because the switch arms merely cause the signal to be turned on or off. The switch arms allow only the detection of whether a vehicle is too close to the wheel-guide rail at some point of the wheel-guide rails, because the activation of a switch arm triggers the display signal, so determining a special switch arm from several triggered switch arms is not possible.

SUMMARY OF THE INVENTION

Therefore, the task of the present invention is to overcome the disadvantages named above and to disclose a wheel-guide rail, a car wash system, and also a method for the central positioning of a vehicle in a travel range of a car wash system, allowing a safe and damage-free treatment and cleaning of vehicles. In particular, the invention should, on one hand, reliably prevent damage to vehicle parts of the vehicle to be washed, especially tires or tire rims, and should, on the other hand, allow central driving and positioning of the vehicle, especially a very wide vehicle, in the car wash system.

The invention solves this problem by a wheel-guide rail, a car wash system, and also a method for the central positioning of a vehicle in a travel range of a car wash system. Advantageous constructions, features, and preferred refinements of the invention are described herein or should be apparent to those skilled in the art to which the invention pertains.

The wheel-guide rail according to the invention is characterized in that, in the wheel-guide rail, at least one distance sensor is provided for measuring the distance from the wheel-guide rail to the outside of a wheel and/or side of the vehicle. In this way, deviation from a central positioning of the vehicle can be detected quickly and easily and a display can be output to the driver of the vehicle that he must steer to bring the vehicle back into the centered position.

In one preferred construction, the distance sensors are non-contact sensors, for example, ultrasound sensors that allow a compact construction of the wheel-guide rails that is not sensitive to sensor damage.

In order to be able to arrange the distance sensor or sensors in the wheel-guide rail, one or more measurement openings spaced apart from each other for the distance sensor or sensors are provided in a wheel-guide flank facing the travel range. The measurement openings are advantageously constructed for holding the distance sensor or sensors. In this way, the distance sensors are arranged countersunk in the wheel-guide rail, in order to prevent sensor damage.

To provide additional protection for sensitive wheel rims and also the distance sensor or sensors, a cover made from plastic or rubber, for example, hard rubber, could be arranged on the wheel-guide flank, wherein the cover has one or more openings spaced apart from each other and aligned with the measurement openings of the wheel-guide flank.

With respect to production, the wheel-guide rail could be formed advantageously from an elongated hollow profile material, advantageously from a hollow steel profile. The distance sensor or sensors could be arranged simply countersunk in this profile and the associated measurement openings could be formed.

An alternative wheel-guide rail that is advantageous with respect to production could be formed from a solid material from plastic or rubber, advantageously hard rubber, wherein damage to sensitive wheel rims is prevented. To increase the stability of the wheel-guide rail for this construction, the solid material could be reinforced on the side of the floor and on a machine flank opposite the wheel-guide flank with an angled longitudinal carrier, advantageously made from metal that is angled in an L shape in one preferred construction.

In the case of one advantageous construction of the invention, an upper end of the wheel-guide flank is constructed so that it is inclined away from the travel range in the installed state of the wheel-guide rail. In this way, a large measurement window for the distance sensors can be created. In this way, if the wheel-guide rails are driven against with the tires, first the lower area of the wheel-guide flank is contacted, while the upper area of the wheel-guide flank inclined away is still sufficiently far away from the tires and rims of the vehicle so that damage to the wheel rim is reliably avoided in the case of a strong impact and low tire cross section.

An inclination angle inclined away from the travel range and formed between the wheel-guide flank and a vertical perpendicular to the floor of the washing system and parallel to the direction of travel, that is, parallel to the wheel-guide rail, preferably lies between 5° and 30°. In the case of smaller inclination angles, impact of the wheel rim cannot be reliably prevented and in the case of larger inclination angles, the wheel-control flank is too flat, so that driving against or over the rail can no longer be reliably noticed by the driver.

The wheel-guide rails according to the invention can be used preferably in a car wash system according to the invention. In the case of this car wash system, the distance of the wheel-guide rails from each other perpendicular to the direction of travel can be advantageously greater than a specified maximum wheel distance. The wheel-guide flanks of the wheel-guide rails can advantageously point toward the travel range, thus they are arranged on the side of the vehicle wheels.

In this way, a method for the central positioning of a vehicle in a travel range of a car wash system according to the invention is advantageously enabled, which is characterized by the following steps: a) two-sided measurement of the distance between the wheel-guide rails and the wheels and/or the sides of the vehicle during the driving of the vehicle into the travel range, b) comparison of the left measurement distance measured from the left wheel-guide rail to the right measurement distance measured from the right wheel-guide rail, c) output of a first direction correction display when the measured right measurement distance is greater than the left measurement distance, or d) output of a second direction correction display when the left measurement distance is greater than the right measurement distance. For a difference between the right and left measurement distances that is less than a specified tolerance range, in Step c) or Step d) no direction correction display and/or direction display can be output. In this way, the driver is not confused by frequently changing direction correction displays or the driver is shown that the vehicle is centered in the travel range and does not have to make corrections.

The distances between the wheel-guide rails and wheels and/or vehicle sides are advantageously measured by the distance sensors in the wheel-guide rails. In one advantageous development of the method, a longitudinal position of the vehicle is determined from the measured measurement distances. In particular, when several distance sensors are distributed across the length of the wheel-guide rails, it can be detected whether a vehicle has already driven past the distance sensor or not. In this way, in addition to the lateral distance of the vehicle, information is also given on its longitudinal position in the washing system. Advantageously, this information can be used to output an advance signal when the vehicle has not yet reached a specified longitudinal position, and/or to output a stop signal when the vehicle has reached the specified longitudinal position, and/or to output a reverse signal when the vehicle has driven past the specified longitudinal position. Thus, the vehicle can be brought into a desired position with respect to the washing system and the treatment assemblies, without having to make additional measurements.

BRIEF DESCRIPTION OF THE DRAWINGS

Other special features and advantages of the invention are given from the following description of preferred embodiments with reference to the drawings. Shown are.

DETAILED DESCRIPTION OF THE INVENTION

Figure 1:
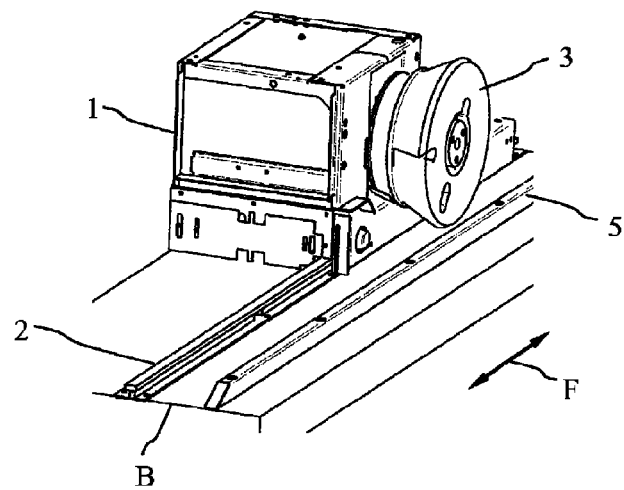
FIG. 1, a schematic three-dimensional diagram of a section of a known car wash system with a moveable washing gantry, FIG. 2, a schematic front view of another section of the car wash system from FIG. 1, FIG. 3, a cross section of three known wheel-guide rails, FIG. 4, a schematic three-dimensional diagram of a section of a car wash system according to the invention with a moveable washing gantry, FIG. 5, a schematic front view of another section of the car wash system from FIG. 4, FIG. 6, a cross section of a wheel-guide rail according to the invention according to a first embodiment, FIG. 7, a cross section through a second embodiment of a wheel-guide rail according to the invention, FIG. 8, a cross section of a third embodiment of a wheel-guide rail according to the invention, FIG. 9, a cross section of a fourth embodiment of a wheel-guide rail according to the invention, FIG. 10, a schematic top view of a part of a car wash system according to the invention according to FIGS. 4 and 5.

In FIGS. 6-9, cross sections of the wheel-guide rails according to the invention are shown in the installed state. The wheel-guide rails have a longitudinal extent adapted to the car wash system as shown in an example in FIG. 4. The wheel-guide rails according to the invention have mounting means not shown in the drawings, for example, boreholes in their base areas, by means of which they can be screwed onto the floor of the washing system. A direction of travel F of a vehicle to be washed in the car wash system runs perpendicular to the plane of the drawing of FIGS. 6-9.

Figure 6:
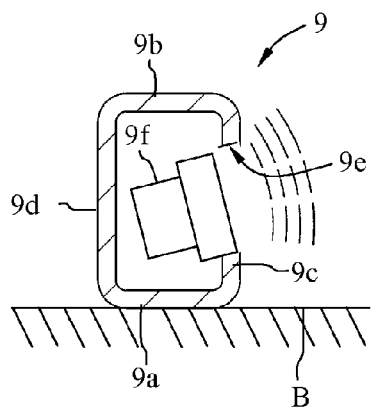

A construction of a wheel-guide rail 9 according to the invention and shown in FIG. 6 is made from an elongated hollow-profile material made from a stable material, here steel. A floor 9a and an end face 9b run coplanar and essentially planar to the floor B of the washing system.

A wheel-guide flank 9c and a machine flank 9d enclose an essentially 90° angle with the floor 9a and end face 9b. To reduce damage to the tire when driving against or over the wheel-guide rail 9, the edge between the end face 9b and wheel-guide flank 9c is rounded. In the wheel-guide flank 9c there is a measurement opening 9e in which a distance sensor 9f is countersunk in the hollow profile of the wheel-guide rail 9. The distance sensor 9f is used to measure the distance to the wheel or to the side of a vehicle that is driving by, as described in detail farther below. The distance sensor 9f is an ultrasound sensor, but other suitable sensor types, for example, infrared or radar sensors could be used just as well. The distance sensor 9f is connected by means of connection lines not shown in FIG. 6 to a controller of the car wash system, wherein this controller evaluates its measurement signals, that is, the measured measurement distances. Advantageously, several such distance sensors 9f are arranged distributed across the length of the wheel-guide rail 9, preferably at equal distances.

Figure 7:
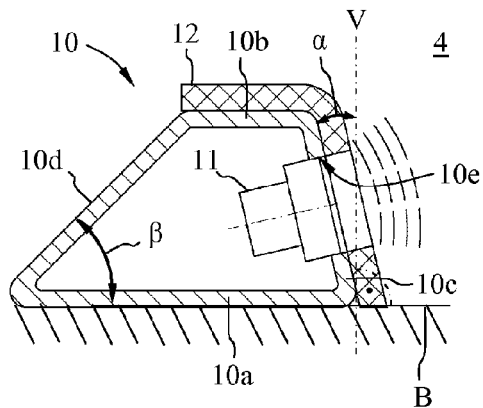

A construction of the invention shown in FIG. 7 shows a wheel-guide rail 10 with a trapezoidal cross section. The floor 10a is wider than the end face 10b, so that a wheel-guide flank 10c is inclined away from the travel range 4 from the floor 10a to the end face 10b. An inclination angle α between the wheel-guide flank 10c and a vertical V perpendicular to the floor B of the washing system and parallel to the direction of travel F or installed wheel-guide rail 10 equals, in the present case, 14°. If the angle α is selected steeper than 5° to the vertical V, then there is still the risk that the wheel rim of a vehicle will impact the end face 10b or the edge between the end face 10b and the wheel-guide flank 10d and become damaged. If the inclination is selected flatter than 30° to the vertical V, then the driver of an entering vehicle will no longer notice driving against or over the wheel-guide rail 10, especially for large, heavy vehicles with large tire diameters. A cover 12 made from elastic, stable solid material, here hard rubber, is provided on a wheel-guide flank 10c and on an end face 10b, in order to protect the wheel rims from damage when driving against the wheel-guide flank. The wheel-guide flank 10c furthermore has a measurement opening 10e that also extends through the cover 12 in an aligned way. In the measurement opening 10e, a distance sensor 11 is mounted on the wheel-guide flank 10c and countersunk in the hollow profile of the wheel-guide rail 10. Through the inclined wheel-guide flank 11c, a large measurement window can be provided in a particularly good way for the distance sensors 11, so that the distance sensor 11 can also "see" upward in a very steep angle, which would not be possible for a vertical wheel-guide flank as shown in FIG. 6.

The construction of the invention shown in FIG. 8 differs from that in FIG. 6 in that a wheel-guide flank 13c corresponding to the construction shown in FIG. 7 is inclined away from the travel range 4 by an inclination angle α. In this way, the advantages named for FIG. 7 are produced. In particular, the distance sensor 13f could be offset outward very wide in the measurement opening, so that its measurement range can be used completely and is not negatively affected by the upper edge of the measurement opening 13e. This construction thus simultaneously represents good protection against damage to the distance sensor 13f and the wheel rim of a vehicle when it drives against the wheel-guide rail 13 and nevertheless offers good use of the possible measurement field of the distance sensor 13f.

The other construction of a wheel-guide rail 14 according to the invention and shown in FIG. 9 has essentially the same outer contours as the construction shown in FIG. 8. The wheel-guide rail 14, however, differs in that the wheel-guide rail 13 is made from an elongated metal carrier 15 with an L-shaped cross section and a solid material 16 arranged on this carrier and made from elastic, stable rubber, advantageously hard rubber, with the cross section shown in FIG. 9. Here, the metal carrier 15 forms a floor 14a and a machine flank 14d of the wheel-guide rail, while the solid material 16 forms an end face 14b and also a wheel-guide flank 14d. This construction has the advantage that, due to the hard-rubber solid material 16 that is indeed stable, but softer relative to the wheel rims made from metal, e.g., steel or aluminum, damage to the wheel rims can be reliably prevented. Due to the reinforcement of the hard-rubber solid material 16 by the L-shaped steel carrier 15, sufficient stability of the wheel-guide rail 14 is also guaranteed. In the inclined wheel-guide flank 14c, a measurement opening 14e is formed in which a distance sensor 14f is completely countersunk. This construction has the advantage that, due to hard-rubber solid material 16 that is indeed stable, but softer relative to the wheel rims made from metal, e.g., steel or aluminum, damage to the wheel rims can be reliably prevented. Through the reinforcement of the hard-rubber solid material 16 by the L-shaped steel carrier 15, sufficient stability of the wheel-guide rail 14 is also guaranteed. The distance sensor 14f countersunk completely in the wheel-guide rail 14 is likewise advantageously protected against damage from the outside, especially when the rail is driven against by the vehicle tires.

Figure 2:
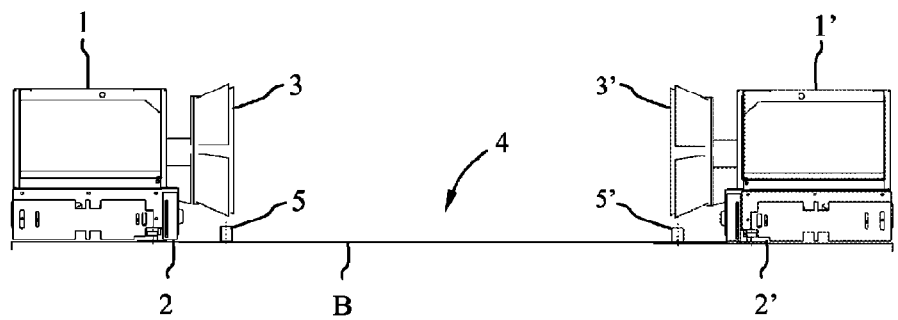
Figure 3:
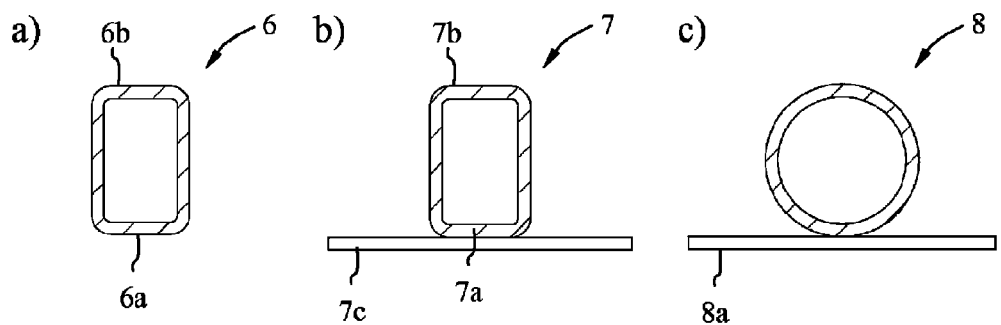
Figure 4:
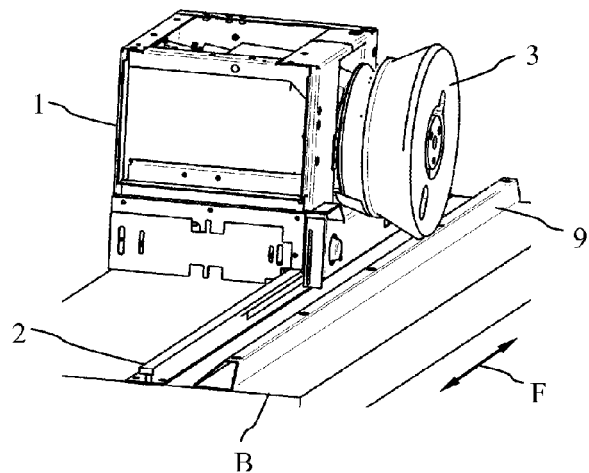
Figure 5:
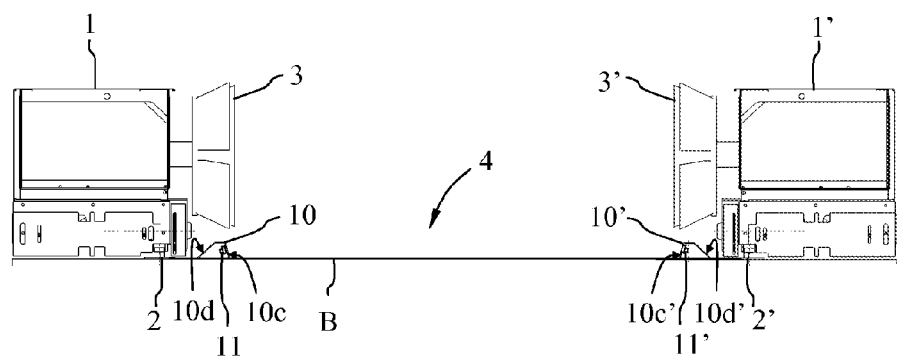

FIGS. 4 and 5 show a car wash system with a wheel-guide rail according to the invention. The sole difference from the car wash system shown in FIGS. 1 and 2 is that, in the embodiment according to FIGS. 4 and 5, a wheel-guide rail 10 or 10' according to FIG. 7 is used, wherein, for reasons of clarity, the cover 12 is not shown. Instead of the wheel-guide rail 10 or 10', the other wheel-guide rails according to the invention could also be used according to one of the preceding embodiments according to FIGS. 6-9.

Through the inclined wheel-guide flanks 10c, 10c', the driver of a vehicle moving in the travel range 4 could position his vehicle centrally, without having to fear damaging the vehicle tires and/or wheel rims by driving against one of the wheel-guide flanks 10c, 10c'.

The function of the distance sensors 11, 11' shall now be explained with reference to FIGS. 4, 5, and 10. In the wheel-guide rails 10, 10', a plurality of distance sensors are arranged at equal distances from each other, wherein, as examples, distance sensors 11a-11e and 11'a-11'e are designated, respectively. To obtain optimum distances to the treatment assemblies, a vehicle 17 to be washed should be in the central target position P* that is defined by the wheel-guide rails 10, 10' laterally by desired distances A*, A'* and forward by a desired longitudinal position L*.

While the vehicle 17 is moving in the travel range 4 in the forward direction Vw of the direction of travel F, all of the distance sensors 11, 11' measure the distance of the vehicle wheels of the vehicle from the corresponding right and left wheel-guide rails 10, 10', respectively. As an example, FIG. 10 shows the actual distance A and A' between the vehicle tires and wheel-guide rails 10, 10' at the height of the distance sensors 11c, and 11'c, respectively. Because it cannot be determined without greater expense whether the distance sensors 11, 11' are measuring just the distance to the tire, wheel, or to the side of the vehicle, a controller of the washing system calculates the difference from the measured measurement distance of the distance sensors 11 of the left wheel-guide rail 10 and from the measured measurement distance of the corresponding opposing distance sensor 11' of the right wheel-guide rail 10'. For example, the difference of the distance sensors 11'c, 11c in FIG. 10 equals zero, because both are the same size. As long as the difference is zero, that is, the measurement distances of both distance sensors 11, 11' are equal, the vehicle is located in the desired central position with respect to the wheel-guide rails 10, 10' within the travel range 4. However, if the vehicle 17 deviates from this central position toward the right or left, then the distance to one of the wheel-guide rails 10 decreases and the distance to the other wheel-guide rail 10' increases. The measurement distances of distance sensors 11, 11' are not equal to each other. Here, the controller outputs a direction correction display to a display of the washing system, wherein this display informs the driver that he is too far to one side and must steer to move the vehicle in the other direction and thus toward the center. The display can be realized in the form of two arrows, wherein one points toward the right and the other points toward the left. The direction in which the driver should steer the vehicle to bring it back to the centered position is displayed by illuminating the appropriate arrow. For example, if the distance A of the left tire to the left wheel-guide rail 10 is less than the distance A' of the right tire to the right wheel-guide rail 10', then the vehicle is too far to the left, so the right arrow is activated, and vice versa. In addition, for a correct, side-centered placement of the vehicle, a direction display is output, e.g., an arrow pointing straight ahead, which informs the driver that he is centered and does not have to steer. To prevent back and forth switching between the associated direction correction displays in the case of small deviations in the associated right-side and left-side measurement distances caused, among other things, by measurement interference, which would only confuse the driver, in this case the output of the corresponding direction correction display is suppressed. The corresponding direction correction display is output only when the difference between the right and left measurement distance is outside of the tolerance range that can be adjusted by the desired distances A*, A'*, that is, when the distance difference is becoming larger and larger.

In the same way, the longitudinal position L of the vehicle 17 can be determined by the distance sensors 11, 11' of the wheel-guide rails 10, 10', so that a desired longitudinal position L* can be achieved. In FIG. 10, the desired longitudinal position L* is reached when the front of the vehicle is at the height of the distance sensors 11e, 11'e. As long as the distance sensors 11e, 11'e do not measure distance, that is, do not detect a vehicle, it is indicated to the driver by an advance signal that he should keep moving in the forward direction Vw, e.g., by a green signal light. As soon as the distance sensors 11e, 11'e each measure a distance, that is, the front of the vehicle reaches the distance sensors 11e, 11'e, it is indicated to the driver by a stop signal that he stay still, for example, by a red signal light. If the vehicle moves past the desired longitudinal position L*, which is advantageously detected by the distance sensors 11f, 11f, then it is indicated to the driver by a reverse signal that he should move backward until the vehicle clears the distance sensors 11f, 11'f, and 11e, 11'e.

Thus, while driving, feedback is given both on the lateral position of the vehicle and also on its longitudinal position L. In one advantageous construction of the invention, a vehicle position in the travel range 4 is determined from the measurement distances and this position is displayed relative to the desired position P* of the vehicle 17. For example, for the desired position P*, the rectangle with dashed lines in FIG. 10 can be displayed in a display on which the currently measured position of the vehicle 17 is simultaneously displayed continuously. The driver thus sees how the vehicle sits relative to the desired position P*, and in which direction he must steer or drive in order to bring the vehicle into the desired position P*. As soon as the vehicle 17 is in the desired position P*, a corresponding display can be displayed on the display, for example, the displayed desired position P* and vehicle position can blink. An alternative and advantageous display would be to display the displayed vehicle position in red until it reaches the desired position P* and then to display the displayed vehicle position in green.

The invention claimed is:

1. A car wash system operable to treat a vehicle which is travelable along a longitudinal travel path through the car wash system, the car wash system comprising:
   a pair of wheel guide rails provided on a floor surface of the car wash system and oriented substantially parallel to each other with the longitudinal travel path between the pair of wheel guide rails, each wheel-guide rail including
      a plurality of measurement openings in a wheel-guide flank on the side of the respective wheel-guide rail facing the travel path, the measurement openings spaced apart from one another, and
      a distance sensor provided in each measurement opening and directed towards the travel path in order to measure the distance from the respective wheel-guide rail to the vehicle on the travel path, each of the distance sensors countersunk in the measurement opening so that the distance sensors do not project beyond the wheel-guide flank in a lateral direction;
   a controller in electronic communication with each of the distance sensors to determine if the vehicle laterally deviates from the travel path; and
   an output device in electronic communication with the controller to alert a driver of the vehicle to adjust the travelling direction of the vehicle back to the travel path.

2. The car wash system according to claim 1, wherein each of the distance sensors is a sensor operating with a non-contact method.

3. The car wash system according to claim 1, wherein each of the measurement openings is constructed for holding one of the distance sensors.

4. The car wash system according to claim 1, each of the pair of wheel guide rails further including a cover made from plastic or hard rubber arranged on the wheel-guide flank, wherein the cover has one or more openings that are spaced apart from each other and align with the measurement openings of the wheel-guide flank.

5. The car wash system according to claim 1, wherein the each of the pair of wheel-guide rails is formed from an elongated hollow profile material or from a solid material made from plastic or rubber.

6. The car wash system according to claim 5, wherein the solid material is reinforced on the floor side and on a machine flank opposite the wheel-guide flank with an angled, L-shaped longitudinal carrier.

7. The car wash system according claim 1, wherein an upper end of the wheel-guide flank is constructed so that it is inclined away from the travel path in an installed state of the wheel-guide rail.

8. The car wash system according to claim 1, further comprising treatment devices that can be moved along the travel path for a vehicle to be treated.

9. The car wash system according to claim 1, wherein the distance of the wheel-guide rails from each other is greater than a specified maximum wheel spacing of the vehicle.

10. A method for the central positioning of a vehicle in a travel path of the car wash system according to claim 1, the method comprising the following steps:
    a) two-sided measurement of the distance between wheel-guide rails and at least one of wheels and vehicle sides of the vehicle during the travel of the vehicle in the travel range,
    b) comparison of a left measurement distance measured from the left wheel-guide rail to a right measurement distance measured from the right wheel-guide rail,
    c) output of a first direction correction display when the right measurement distance is greater than the left measurement distance, or
    d) output of a second direction correction display when the left measurement distance is greater than the right measurement distance.

11. The method according to claim 10, wherein, if the difference between the right and left measurement distances is less than a specified tolerance range in Step c) or Step d), no direction correction display is output.

12. The method according to claim 10, wherein the distances between the wheel-guide rails and the at least one of the wheels and the vehicle sides are measured by the distance sensors in the wheel-guide rails.

13. The method according to claim 10, wherein, from the measurement distances, a longitudinal position of the vehicle is determined and/or a vehicle position is defined on the travel path, and the vehicle position and a desired position of the vehicle are displayed relative to each other.

14. The method according to claim 13, wherein an advance signal is output when the vehicle has not yet reached a desired longitudinal position and a stop signal is output when the vehicle has reached the desired longitudinal position and a reverse signal is output when the vehicle has driven past the desired longitudinal position.

15. The car wash system according to claim 1, wherein the wheel-guide flank is sloped at an angle with respect to the normal of the floor surface of the car wash system.

16. The car wash system according to claim 15, wherein the angle is greater than or equal to 5° and less than or equal to 30°.

17. The car wash system according to claim 15, wherein the distance sensor is oriented at substantially the same angle as the slope of the wheel-guide flank.

\* \* \* \* \*